(No Model.) 3 Sheets—Sheet 1.
E. B. PHILLIPS.
ELECTRIC MOTOR CAR.
No. 466,832. Patented Jan. 12, 1892.
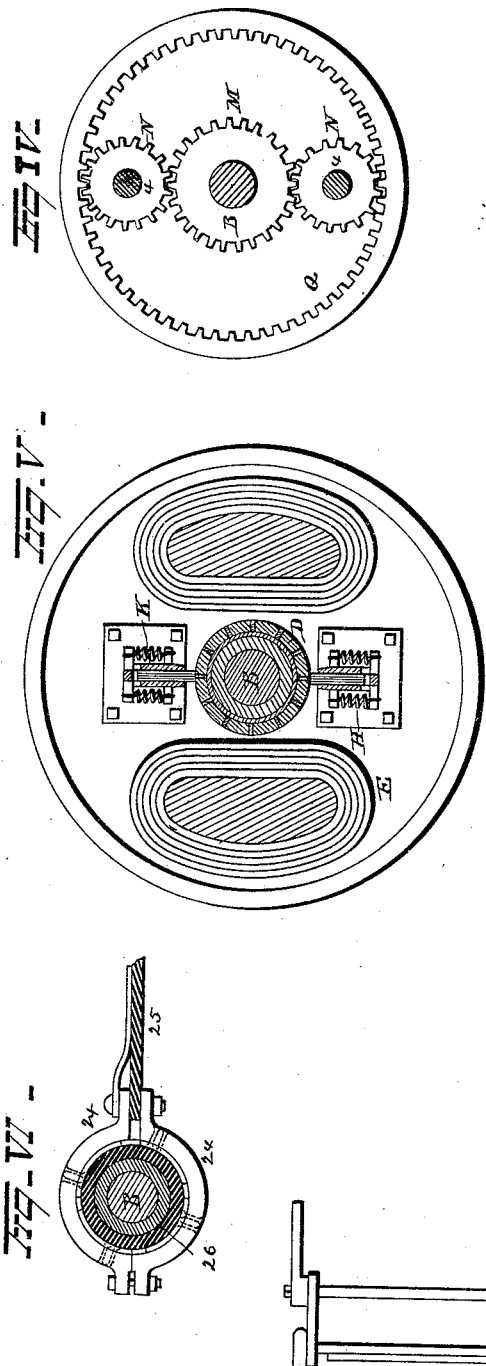
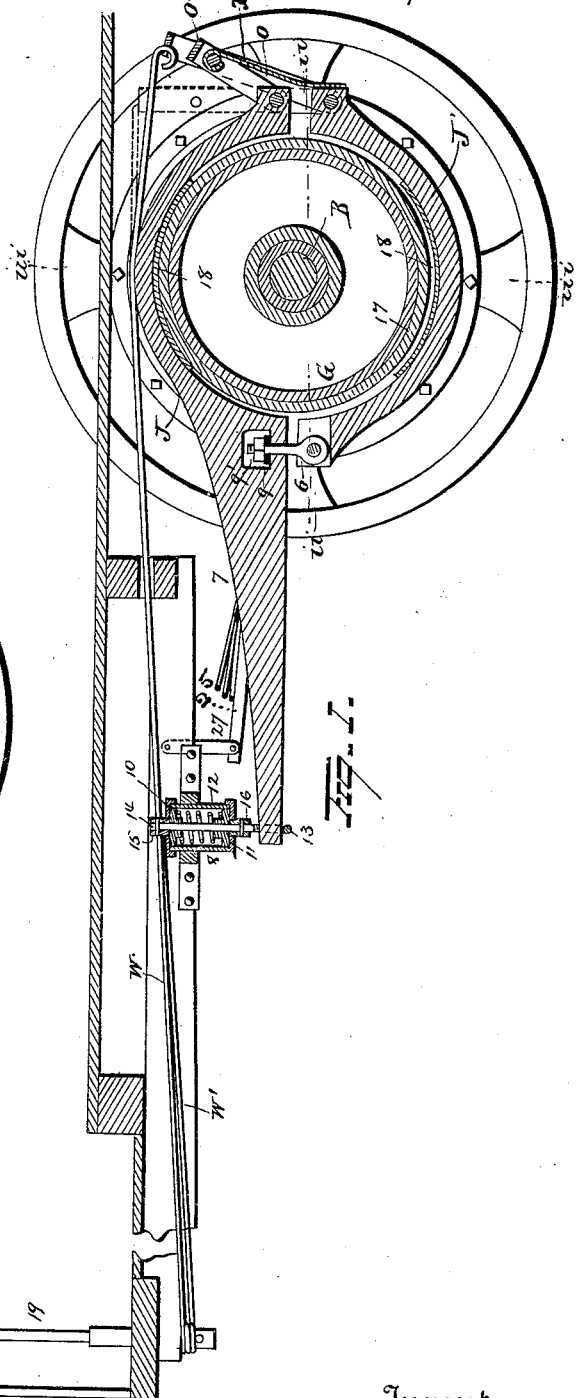
Witnesses
Inventor
E. B. Phillips
Attorney (No Model.) 3 Sheets—Sheet 2.
E. B. PHILLIPS.
ELECTRIC MOTOR CAR.
No. 466,832. Patented Jan. 12, 1892.
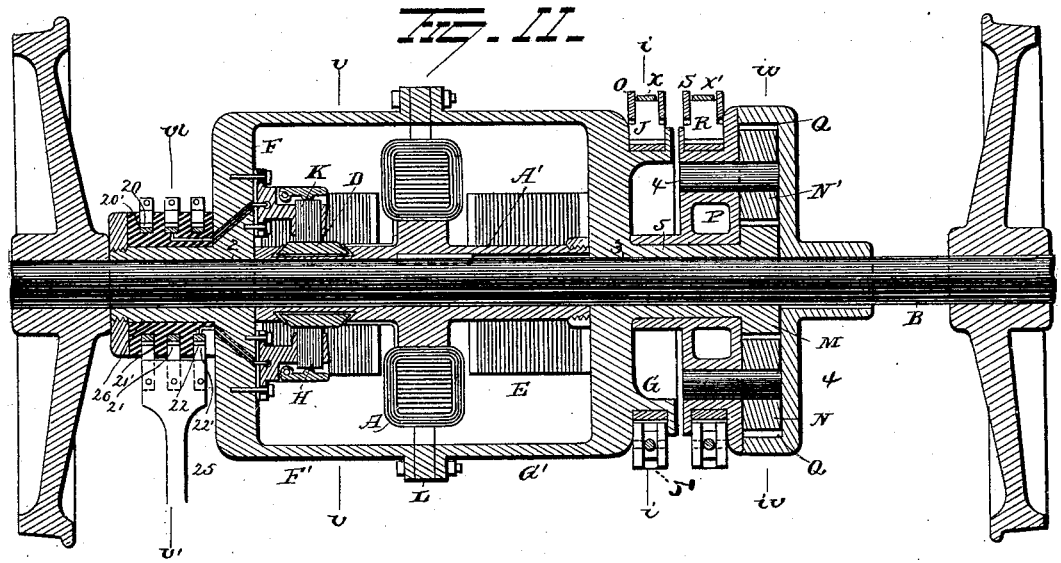
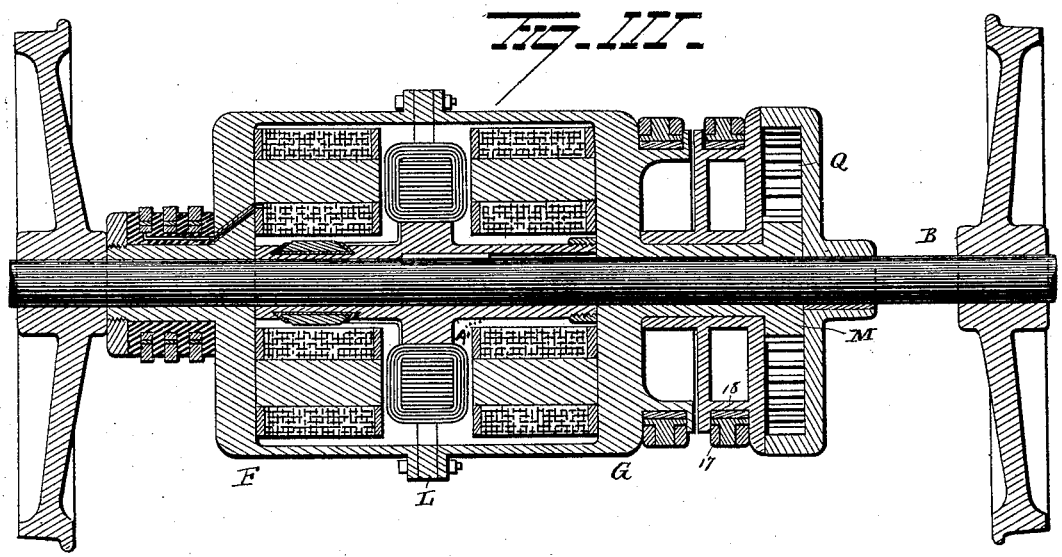
Witnesses
Inventor
E. B. Phillips
Attorney (No Model.)  3 Sheets—Sheet 3.
E. B. PHILLIPS.
ELECTRIC MOTOR CAR.
No. 466,832. Patented Jan. 12, 1892.
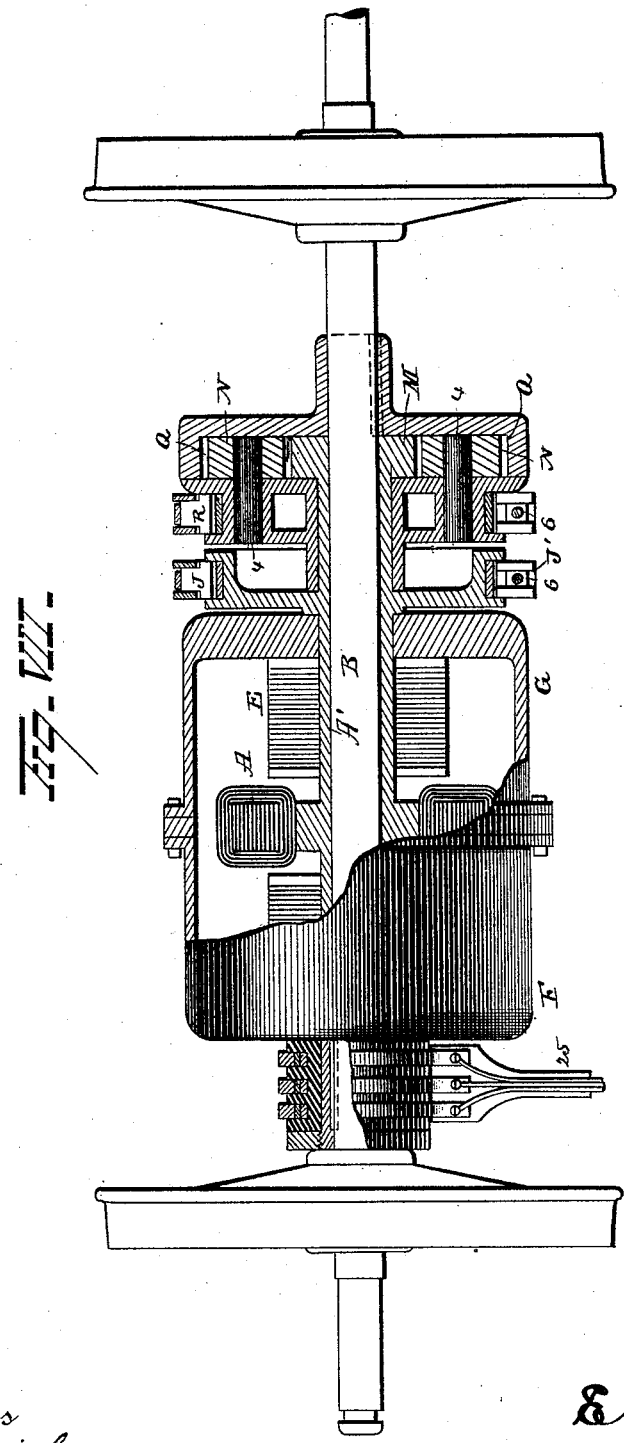
Witnesses
Inventor
E. B. Phillips
Attorney

UNITED STATES PATENT OFFICE.

ELBERT B. PHILLIPS, OF CLEVELAND, OHIO.

ELECTRIC-MOTOR CAR.

SPECIFICATION forming part of Letters Patent No. 466,832, dated January 12, 1892.

Application filed January 6, 1891. Serial No. 376,922. (No model.)

*To all whom it may concern:*

Be it known that I, ELBERT B. PHILLIPS, of Cleveland, in the county of Cuyahoga and State of Ohio, have invented certain new and useful Improvements in Electric-Motor Cars; and I do hereby declare the following to be a full, clear, and exact description of the invention, such as will enable others skilled in the art to which it appertains to make and use the same.

This invention relates more particularly to electric-motor cars in which the armature of a propelling-motor is placed axially with reference to a driving-axle and is directly connected with said axle; but each of the improvements constituting the invention is included for all the uses to which it may be applicable. By "axially placed" is to be understood that the axes of the armature and car-axle are coincident, or nearly so. By "directly connected" is to be understood that the armature imparts one revolution to the driving-axle for each rotation of said armature.

In accordance with the present invention the armature is placed axially with reference to a car-axle and is connected directly therewith—as, for example, by being mounted fast on said axle—and the field-magnets which are adapted to rotate are combined with a gripper or holder of suitable description for holding them from rotation and also with gearing through which said field-magnets may drive the car-axle. Suitable means are provided whereby the gearing may be put into or out of engagement at will. By holding the field-magnets with the gripper or its substitute the motor operates through the direct driving connection, the car-axle or the driving-wheels making one revolution to each rotation of the armature relatively to the field-magnets. By connecting in the gearing the rotation of the armature relatively to the field-magnets may be made any desired multiple of the rotation of the car-axle. Preferably the field-magnets when operating through the driving-gear run backward or in the opposite direction to that in which it is desired to run the car, since the effective rotation of the motor, or, in other words, the rotation of the armature and field relatively to each other, is equal to the sum of their individual motions. Further, it is preferred so to arrange the gripper or holder for the field-magnets and the means for putting the gear into and out of action that the field-magnets can be released while the gear is out of action. Under these conditions, when the motor is supplied with current, the field-magnets rotate idly and the car can be started either by holding the field-magnets or putting the gear into action. The gear is preferably adapted to increase the torque of the motor on the car-axle, and this would naturally be employed in starting the car on an upgrade with a heavy load, while the arrest of the field-magnets would be resorted to with a light load on a level. When the car has been started, it can be made to run through the direct coupling or through the gear, according to the conditions which may render a slow speed or great traction desirable, or which may render a higher speed desirable while less traction is necessary.

So far as I am aware, it is new, in general, to combine with a car motor mechanism whereby the car-axle may be revolved by a direct connection or by gearing, as desired, and such propelling mechanism is included, generally, in the invention irrespective of the precise means or arrangement for establishing the direct or the geared connection between the motor and the car-axle.

The invention extends to the use of any known or suitable motor or gearing in the above connection; but a motor with field-magnets at the sides of the armature has advantages in that the motor is or may be contained within a cylindrical space very little larger in diameter than the armature, and its use is specially included in the invention.

Moreover, the invention includes special features in the matter of the gearing, as follows:

First. The gearing is employed with intermediates symmetrically disposed with reference to the driving-pinion, so as to balance more or less the stress of transmission.

Second. Gearing is employed which can be engaged for the transmission of power to the axle by arresting a movable part and disengaged by releasing said part. In the ordinary clutch the dog or gripper moves with the part clutched thereby. With what is known as "sun-and-planet" gear (or like gearing) transmission may be effected by holding any one of the three parts or elements of the gear from rotation, and on the release of this part (the three parts being now free) the gear revolves idly.

Third. The holder or gripper for retaining the field-magnets and the clutch or gripper for putting the gearing into and out of action are preferably each combined with a spring or buffer so arranged that when said clutch or gripper is operated to apply the power it acts through said spring or buffer, and thus applies the power without shock or jar.

Fourth. While the invention extends to certain combinations involving a clutch or gripper of any known or suitable construction, the gripper shown in the accompanying drawings possesses special features, which conduce to the more efficient operation of the motor mechanism as a whole, and its use is specially included in the invention in combination with the other elements, as herein specified.

In the accompanying drawings, which form part of this specification, Figure I is a partial view in sectional elevation of an electric locomotive containing the present invention, the section being taken on line $i$ of Fig. II. Fig. II is a horizontal section on line $ii$ of Fig. I. Fig. III is a transverse section on line $iii$ of Fig. I. Figs. IV, V, and VI are sections on lines $iv$, $v$, and $vi$, respectively, of Fig. II; and Fig. VII is a horizontal section, partly in plan, showing a modified arrangement.

The armature A, composed of a soft-iron strip wound upon itself and provided with bobbins wrapped about the ring thus formed in notches in the edges of said ring, or it may be an armature of other suitable construction, has a long hub A' and is, as shown in Figs. II and III, mounted fast on the car-axle B. The extra length of hub, however, might be dispensed with. The armature A is not only thus axially placed with reference to the car-axle C, but is also mounted thereon. It is directly connected with or coupled to the same through the key or other means for making the armature fast on the axle. The commutator D is fast on the armature-hub A', or it might be directly on the car-axle. The field-magnets E project from yokes F G at the sides of the armature A, or other suitable arrangement of field-magnets may be adopted. The field-magnets are journaled on the car-axle B at 2 and 3, so that they are free to turn thereon. As shown, the journal-bearings at 2 and 3 are in the yokes F G, which are perforated for the passage of the car-axle. At H K are the commutator-brushes mounted on and insulated from the yoke F. The yokes F G are suitably connected, so as to revolve together, the connections shown being effected by cylinders F' G', cast or formed integral with the yokes F G, and a ring L, bolted between flanges on the adjacent ends of said cylinders.

The yoke G is provided with a rim to be engaged by a gripper or holder J J', or the field-magnets are otherwise adapted to be engaged by a gripper or holder, so as to arrest or check the rotation of the magnets. The gripper shown has two parts or jaws, which are jointed together by means of the eyebolt 6 and are adapted to be drawn together to clamp the rim of G or opened to release it. To draw the jaws J J' together, different devices may be used; but, as shown, there is a lever O jointed to the lower jaw J' and a link O' connecting the lever O and the upper jaw J, so that when said lever is drawn inward the link forces the jaws J J' together with great pressure. The gripper J J' is prevented from turning with the rim and the yoke G by means of an arm 7, which is connected with a part of the car (as the car-body, for example) adapted to hold it from rotation. This arm may be of any desired length, and it is desirable to have it long, since by the increase the stress on the axle when the gripper is on is lessened. To make the application of the gripper more gradual, springs or buffers are employed at one or both of the following points—that is to say, in the connection which holds the gripper from rotating, as at 8, and in one of the connections of the gripper-jaws J J', as at 9. The spring or buffer 8 (shown as a spiral compression-spring) is interposed between two disks 10 and 11, which are loose in a headed cylinder 12. The stirrup 13, which surrounds the end of arm 7, has a stem 14, with sleeves 15 and 16 fast thereon. These sleeves play through the cylinder-heads. When the arm 7 is lifted, the sleeve 16 presses up the disk 11 and compresses the spring 18. When the arm 7 is depressed, it carries down the sleeve 15 and disk 10 and compresses the spring. The cylinder 12 is fastened to the car-body. The spring or buffer 9, of, say, soft vulcanized rubber, is placed under the nut on the eyebolt 6, which is jointed at the opposite end to the jaw J'. By adjusting the nut 9' the grip of the jaws may be regulated, and the interposition of the rubber insures that they shall exert an elastic or yielding pressure. When the gripper has taken a firm hold, the spring or buffer 8 prevents the occurrence of a shock. Renewable wearing-surfaces are shown at 17 and 18 in the form of a wooden ring 17 on the rim of G and metal shoes 18 on the jaws J J'.

The yoke G is provided with a pinion M, which engages the intermediates N, mounted on journal-pins 4 on the disk P, which is journaled on the neck 5, joining the yoke G with the pinion M. The internal gear Q is fast on the car-axle and is engaged by the intermediates N, which are symmetrically disposed about the car-axle. The disk P is adapted to be engaged by the gripper R. This gripper, as shown, is like the gripper J J', already described, and no further description is necessary here. The jaws of gripper R are drawn together by means of the lever S, which is provided with a link, as described for O. To keep dirt from the gears and to allow them to run in oil, they may be inclosed in a gear-box, which, as shown, is formed by adapting the disk P to make a close joint with the gear Q. The levers O and S for the grippers J J′ and R, respectively, may each be operated by a chain W or W′, extending to the end of the car and wrapped about an upright shaft 19, like the chains of an ordinary car-brake, or by other suitable means. The chains W W′ may be wrapped in opposite directions around the same shaft, as indicated in Fig. I, so that by turning the shaft in one direction the gripper R is applied and by turning it in the other direction the gripper R is released and the gripper J J′ is applied. The chains should be so arranged that both grippers may be released at the same time, so as to allow the motor to run idly. Springs X X′ may be employed to retract the levers O S, respectively, and open the grippers J J′ and R, when the chain W or W′ is allowed to unwind from the shaft 19. The current is supplied to the field-coils and the armature-coils of the motor by means of contacts 20 and 20′, 21 and 21′, and 22 and 22′. The latter of each of these pairs of contacts is in the form of an insulated ring on the hub 26 of the yoke F, and the former consists of brushes which are fastened at one end (see Fig. VI) to the two-part ring 24, which is bolted to an arm 25, of non-conducting material, as wood. The wires run to these rings 24 from the reversing-switch. The arm 25 is held from rotation by a connection 27 with the car-body. The object in using three pairs of contacts is so that a reversing-switch may be placed in the loop for the armature or field-magnet, as well understood. The brush K is supposed to be grounded.

The operation of the motor mechanism is as follows: In starting the car the current may be put on by the rheostat or otherwise after either of the grippers (J J′ or R) is applied. In that case the electricity tends to turn the field-magnets backward and armature forward. If the field-magnets be held from rotation by the gripper J J′, the torque on the armature rotates the car-axle by the direct connection. If, however, the gripper R is applied, the field-magnets turn backward and the armature forward, the backward movement of the magnets being transmitted through the pinion M, intermediates N, and gear Q to the car-axle in the forward direction or in the direction in which it is desired for the car to go. The field-magnets E turning backward or in the opposite direction to the armature A, the effective movement of the motor is proportionate to the forward motion of the armature, in addition to the backward motion of the field-magnets. The direct torque or reaction between the armature and field-magnets is of course multiplied correspondingly in the transmission to the car-axle. In order to start the car, it is not necessary to apply either of the grippers before turning on the current. The latter may be applied first, and its effect then is to rotate the field-magnets backward idly. On then applying the gripper R the momentum of the field-magnets tends to continue their movement, which is transmitted to the internal gear Q and the car-axle in the direction to move the car forward. Owing to the construction of the gripper already explained, the application of the power to start the car is very gradually effected. It will further be perceived that as the gripper is applied and the revolution of the field-magnets is decreased the counter electro-motive force diminishes and the current increases automatically until it, aided by the momentum of the field-magnets, suffices to start the car. After the car is started the gripper R may be released and the gripper J J′ applied. The effect of this is to gradually arrest the rotation of the field-magnets and to increase the speed of the car until, the field-magnets being held stationary, the car is propelled by the direct action of the armature. In starting the car the gripper J J′ may be applied after the current is turned on instead of the gripper R, as just described. In that case the application of the gripper J J′ retards the backward rotation of the field-magnets and diminishes the counter electro-motive force of the motor until the current through the motor becomes sufficient to start the car by the direct action of the armature. In stopping the car the current may be cut off or it may be allowed to continue, and the release of the grippers J J′ and R will permit the field-magnets to rotate idly and the car to be stopped by means of brakes or otherwise. To allow the car to coast or to run by its own momentum, the grippers need only be released.

Instead of having the field-magnets connected with the pinion M, the armature may be connected therewith, as illustrated in Fig. VII, the field-magnets being keyed on the car-axle at 28, as well as the gear Q. It will be understood that this reversed arrangement is included in the invention as a substitute for that first described without further specification herein. It will also be understood that of the three parts or elements of the gearing shown—namely, the pinion M, the disk P, with the intermediates N, and the gear Q—the gripper R might be applied to any one of them, the other two being connected one with the armature and the other with the field-magnets. It is not necessary to use an internal gear, since outside gears only might be used, and various other modifications in the gearing could be made without departing from the invention. Instead of applying the motor mechanism as shown, to a car-axle, it might be applied to any shaft which it is desired to run.

Having fully described my invention, what I claim as new, and desire to secure by Letters Patent, is—

1. The combination, with a car, of a motor having a rotatable armature axially placed with reference to and directly connected with a car-axle and rotatable field-magnets, a gripper or holder for preventing the rotation of the field-magnet, so that the motor may propel the car direct, a gripper, and gearing between the axle and the field-magnets adapted to be put into and out of action, so that the motor may propel the car through said gearing, substantially as described.

2. The combination, with a car, of a motor having a rotatable armature axially placed with reference to and directly connected with a car-axle and rotatable field-magnets, a gripper or holder for preventing the rotation of the field-magnets, so that the motor may propel the car direct, a gripper, and gearing between the axle and the field-magnets, said gearing adapted to be put into and out of action and when in action to propel the car forward by the rotation of the field-magnets backward, substantially as described.

3. The combination, with a car, of a motor having a rotatable armature axially placed with reference to and directly connected with a car-axle and rotatable field-magnets, a gripper or holder for preventing the rotation of the field-magnets, so that the motor may propel the car direct, a gripper, gearing between the axle and the field-magnets, and operating means whereby said grippers may be applied or the said field-magnets allowed to rotate idly, substantially as described.

4. The combination, with a car, of a propelling-motor provided with a direct driving connection with the car-axle and also with driving-gear and adapted to rotate said axle directly or through said gearing, substantially as described.

5. The combination, with a car, of a propelling-motor provided with a direct driving connection with the car-axle and also with driving-gear, and grippers whereby said motor may be engaged with the car-axle, so as to drive the same direct or through the gearing, substantially as described.

6. The combination, with a car, of a propelling-motor provided with a direct driving connection with a car-axle and also with driving gear and adapted to rotate said axle directly or through said gearing and having the armature axially placed with reference to said axle, substantially as described.

7. The combination, with a car, of a propelling-motor having an armature placed axially with reference to and directly connected with a car-axle and serving as a direct driving connection for the car-axle and also provided with driving-gear, and grippers whereby said motor may be engaged with a car-axle, so as to drive the same direct or through said gearing, substantially as described.

8. The combination, with a car, of a motor having a rotatable armature mounted fast on a car-axle and rotatable field-magnets, a gripper or holder for preventing the rotation of the field-magnets, so that the motor may propel the car direct, and gearing between the field-magnets and axle adapted to be put into and out of action, substantially as described.

9. The combination, with a car, of a motor having a rotatable armature axially placed with reference to and directly connected with a car-axle, rotatable field-magnets at the sides of the armature, a gripper or holder for preventing the rotation of the field-magnets, and gearing adapted to be put into and out of action, substantially as described.

10. The combination, with a car, of a propelling-motor provided with a direct driving connection with a car-axle and also with driving-gear and adapted to rotate said axle directly or through said gear and having an armature axially placed with reference to and directly connected with the said car-axle and the field-magnets at the sides of said armature, substantially as described.

11. The combination, with a car, of a motor having a rotatable armature axially placed with reference to and directly connected with a car-axle, rotatable field-magnets projecting at the sides of the armature from yokes which have openings for the passage of said axle, a gripper or holder for preventing the rotation of the field-magnets, and gearing adapted to be put into and out of action, substantially as described.

12. The combination, with a car, of a propelling-motor having a rotatable armature and rotatable field-magnets, gearing, such as sun-and-planet gear, adapted to be put into and out of action by arresting or freeing a movable part, a gripper or holder for said field-magnets, and a gripper for said movable part of the gearing, said grippers having each one or more springs or buffers, substantially as described.

13. The combination, with a car, of a propelling-motor having a rotatable armature and rotatable field-magnets, gearing, such as sun-and-planet gear, adapted to be put into and out of action by arresting or freeing a movable part, a gripper or holder for said field-magnets, and a gripper or holder for said movable part of the gearing, said grippers or holders being each composed of jaws, one at least of which has a projection whereby it is secured to a part of the car adapted to prevent it from rotating, substantially as described.

14. A motor having a rotatable armature axially placed with reference to and directly connected with a shaft and rotatable field-magnets, in combination with a gripper or holder for preventing the rotation of the field-magnets, and gearing adapted to be put into and out of action, substantially as described.

15. A motor having a rotatable armature and rotatable field-magnets, in combination with a gripper or holder for preventing the rotation of the field-magnets, and gearing between the field-magnets and armature-shaft adapted to be put into and out of action and when in action to rotate the shaft forward by the rotation of the field-magnets backward, substantially as described.

16. A motor having a rotatable armature axially placed with reference to and directly connected with a shaft and rotatable field-magnets, in combination with a gripper or holder for preventing the rotation of the field-magnets, gearing adapted to be put into and out of action, and operating means whereby said gripper may be applied or said gearing put into action or the said field-magnets may be allowed to rotate idly, substantially as described.

17. A motor provided with a direct connection with a shaft and also with driving-gear and adapted to rotate said shaft directly or through said gear, substantially as described.

18. A propelling-motor having a rotatable armature and rotatable field-magnets, in combination with gearing between the field-magnets and the armature-shaft, and grippers for the field-magnets and for the gearing, whereby the armature may actuate the shaft, so as to rotate the same direct, or the field-magnets may react upon the armature through the gearing, substantially as described.

19. A motor having its field-magnets and armature both mounted on a shaft, in combination with gearing through which the motor may drive said shaft, and means, such as described, whereby the said motor may rotate the said shaft directly, substantially as described.

20. A motor having a rotatable armature mounted fast on a shaft and rotatable field-magnets, in combination with a gripper or holder for preventing the rotation of the field-magnets, and gearing adapted to be put into and out of action, substantially as described.

21. A motor having a rotatable armature axially placed with reference to and directly connected with a shaft and rotatable field-magnets at the sides of the armature, in combination with a gripper or holder for preventing the rotation of the field-magnets, and gearing adapted to be put into and out of action, substantially as described.

22. A motor having a rotatable armature and rotatable field-magnets projecting at the sides of the armature from yokes which have openings for the passage of the armature-shaft, in combination with a gripper or holder for preventing the rotation of the field-magnets, and gearing adapted to be put into and out of action, substantially as described.

23. A motor having a rotatable armature and rotatable field-magnets, in combination with gearing, such as sun-and-planet gear, adapted to be put into and out of action by arresting or freeing a movable part, a gripper or holder for said field-magnets, and a gripper or holder for said movable part of the gearing, substantially as described.

24. A motor having a rotatable armature and rotatable field-magnets, in combination with gearing, such as sun-and-planet gear, adapted to be put into and out of action by arresting or freeing a movable part, a gripper or holder for said field-magnets, and a gripper or holder for said movable part of the gearing, said grippers having one or more springs or buffers, substantially as described.

25. A motor having a rotatable armature and rotatable field-magnets, in combination with gearing, such as sun-and-planet gear, adapted to be put into or out of action by arresting or freeing a movable part, a gripper or holder for said field-magnets, and a gripper or holder for said movable part of the gearing, said grippers being each composed of jaws, one at least of which has a projection, whereby said gripper is held from rotation, substantially as described.

In testimony whereof I have signed this specification in the presence of two subscribing witnesses.

ELBERT B. PHILLIPS.

Witnesses:
   A. B. CALHOUN,
   W. A. PALLANT.